(12) United States Patent
Wang et al.

(10) Patent No.: US 7,431,609 B2
(45) Date of Patent: Oct. 7, 2008

(54) PORTABLE ELECTRONIC DEVICE WITH FASTENING MECHANISM

(75) Inventors: He-Li Wang, Guangdong (CN); Xiang-Hui Zhang, Guangdong (CN); Wen-Jie Bao, Guangdong (CN)

(73) Assignees: Hong Fu Jin Precision Industry (Shen Zhen) Co., Ltd., Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 346 days.

(21) Appl. No.: 11/306,919

(22) Filed: Jan. 17, 2006

(65) Prior Publication Data
US 2007/0035916 A1 Feb. 15, 2007

(30) Foreign Application Priority Data
Aug. 12, 2005 (CN) .................... 2005 2 0063113 U

(51) Int. Cl.
H01R 3/00 (2006.01)
(52) U.S. Cl. .................................................. 439/500
(58) Field of Classification Search ................ 439/500, 439/374; 361/681, 683; 340/628; 429/97, 429/100
See application file for complete search history.

(56) References Cited

U.S. PATENT DOCUMENTS

| 5,265,275 | A | * | 11/1993 | Goldenberg et al. ........ 455/348 |
| 5,505,635 | A | * | 4/1996 | Willows et al. ............. 439/500 |
| 5,677,827 | A | * | 10/1997 | Yoshioka et al. ............ 361/683 |
| 5,729,478 | A | * | 3/1998 | Ma et al. .................... 361/683 |
| 6,233,141 | B1 | * | 5/2001 | Lee et al. .................... 361/683 |
| 6,495,987 | B2 | | 12/2002 | Kuo et al. |
| 6,808,842 | B2 | | 10/2004 | Siddiqui et al. |

FOREIGN PATENT DOCUMENTS

CN 2574178 Y 9/2003

\* cited by examiner

*Primary Examiner*—Alexander Gilman
(74) *Attorney, Agent, or Firm*—Winston Hsu

(57) ABSTRACT

A portable electronic device with a fastening mechanism includes a main body and a subsidiary casing. The main body comprises a bottom wall and a side wall extending from one edge of the bottom wall. A receptacle is defined in the sidewall thereof. The subsidiary casing is configured for receiving a battery therein. The subsidiary casing comprises a latch formed thereon. The latch is engaged into the receptacle to prevent the subsidiary casing from moving along a first direction, wherein the latch is inserted into the receptacle along a second direction that is perpendicular to the first direction when the subsidiary casing is assembled to the main body.

12 Claims, 7 Drawing Sheets

PORTABLE ELECTRONIC DEVICE WITH FASTENING MECHANISM

FIELD OF THE INVENTION

The present invention generally relates to a portable electronic device with a fastening mechanism. The portable electronic device includes a main body and a subsidiary casing. The fastening mechanism is for connecting the main body and the subsidiary casing.

DESCRIPTION OF RELATED ART

In recent years, electronic apparatus such as portable DVD players, Notebook computers, and PDAs (Personal Digital Assistants) have been widely used due to their portability and convenience. In order to work anywhere and anytime, the portable electronic apparatus usually needs batteries. However, conventional batteries are usually unsuitable because they are not small enough to be received in the portable electronic apparatus, and portable electronic apparatuses are getting smaller and smaller.

Therefore, a portable electronic device with an exterior power supply has been proposed. The portable electronic device includes a main body and a subsidiary casing containing batteries for supplying power to the main body. Screws and nuts are used to connect the main body and the subsidiary casing. However, it is not convenient for users to attach the subsidiary casing to the main body.

Accordingly, as shown in FIGS. 6 and 7, an improved fastening mechanism for an optical disc player is proposed. The optical disc player 100 includes a main body 110 and a subsidiary casing 120 removably attached to the main body 110. The main body 110 has a right-side wall 119 with a receptacle 111 horizontally extended therein. Two pairs of blocks 113, 114, and 115, 116 vertically extend from the right-side wall 119 covering portions of the receptacle 111. A locking hole 112 is also defined in the right-side wall 119 and communicates with the receptacle 111, so as to lock the subsidiary casing 120 onto the main body 110.

The subsidiary casing 120 has a first lateral surface 129, which mates with the right-side wall 119 of the main body 110 when the subsidiary casing 120 is attached to the main body 110. The first lateral surface 129 has a hole 123. An L-shaped latch 121 perpendicularly extends from the first lateral surface 129, and is configured for being received in the receptacle 111 of the main body 110. A connector 122 is movably installed in the subsidiary casing 120. The connector 122 has a protrusion 124 at a distal end thereof. The protrusion 124 protrudes out of the subsidiary casing 120 from the hole 123 and is received into the locking hole 112 of the main body 110 for locking the subsidiary casing 120 onto the main body 110, and can be drawn back into the subsidiary casing 120 for releasing the subsidiary casing 120 from the main body 110.

When the subsidiary casing 120 is attached to the main body 110, the latch 121 of the subsidiary casing 120 is inserted into the receptacle 111 and slid into position to be received and blocked by the blocks 113, 114, 115, 116. The protrusion 124 is inserted into the locking hole 112 for preventing the latch 121 from sliding along the receptacle 111. Therefore, the subsidiary casing 120 is fastened onto the main body 110.

However, it is not an obvious operation that the latch 121 of the subsidiary casing 120 should be inserted into the receptacle 111. Users often have difficulty in inserting the latch 121 into the receptacle 111. Therefore, the improved fastening mechanism is still complex and inconvenient to users.

Therefore, a portable electronic device with a simple fastening mechanism is needed in the industry to address the aforementioned deficiencies and inadequacies.

SUMMARY OF INVENTION

A portable electronic device comprises a main body and a subsidiary casing. The main body comprises a bottom wall and a side wall extending from one edge of the bottom wall. A receptacle is defined in the sidewall thereof. The subsidiary casing is configured for receiving a battery therein. The subsidiary casing comprises a latch formed thereon. The latch is engaged into the receptacle to prevent the subsidiary casing from moving along a first direction, wherein the latch is inserted into the receptacle along a second direction that is perpendicular to the first direction when the subsidiary casing is assembled to the main body.

Other systems, methods, features, and advantages of the present portable electronic device with a fastening mechanism will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION

Reference will now be made to the drawings to describe a preferred embodiment of the present portable electronic device.

Figure 1:
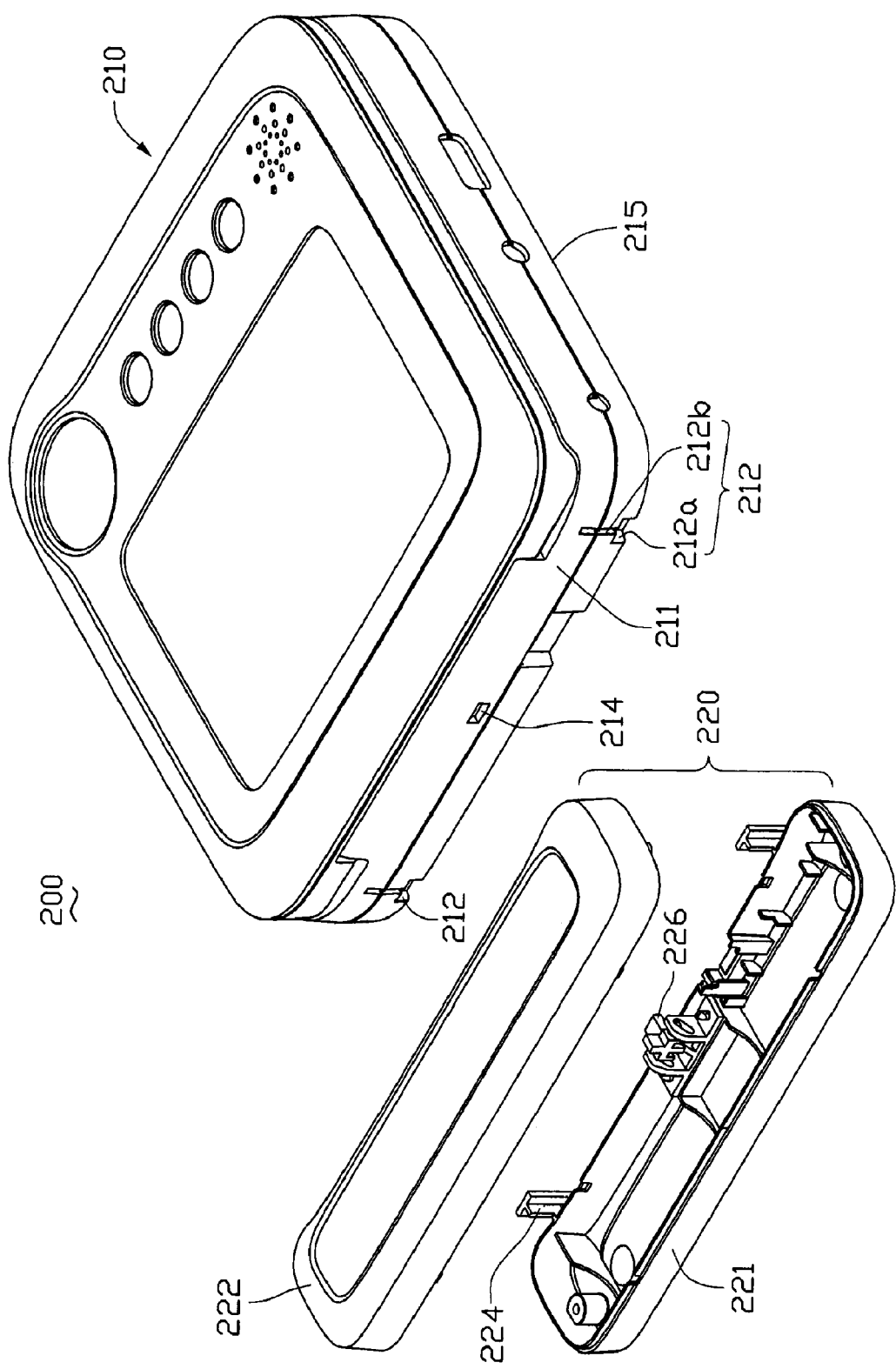
FIG. 1 is a partially exploded, isometric view of a portable disc player in accordance with an exemplary embodiment of the present invention, the portable disc player including a main body and a subsidiary casing.

Referring to FIG. 1, a portable disc player 200 includes a main body 210 and a subsidiary casing 220. The main body 210 is used for reading an optical disc (not shown) and displaying information read from the optical disc. The subsidiary casing 220 removably attached to the main body 210 is used for receiving batteries (not shown) therein, so as to supply power to the main body.

Figure 2:
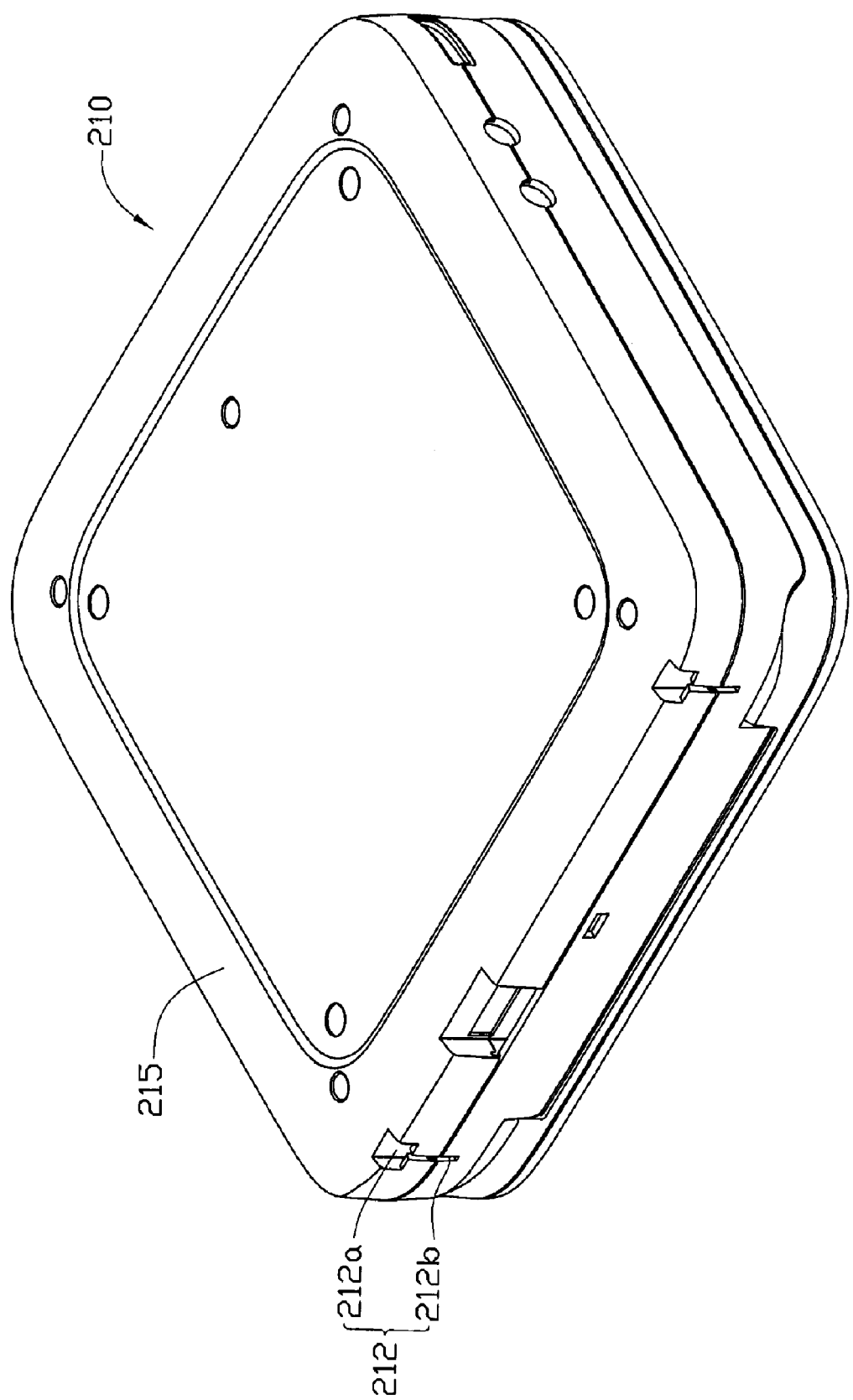
FIG. 2 is an enlarged view of the main body of FIG. 1, but viewed from another aspect.

The main body 210 has a first side wall 211 facing the subsidiary casing 220. Two receptacles 212 are defined in the first side wall 211 and extend upwardly from the lower border of the first side wall 211. A hole 214 is defined in a middle portion of the first side wall 211. As shown in FIG. 2, each receptacle 212 has a cavity 212a and a slot 212b communicating with the cavity 212a. The cavity 212a spans from a bottom wall 215 of the main body 210 where the bottom wall 215 adjoins the first side wall 211 up into the main body 210. A vertical slot 212b is defined in a part of the first side wall 211 that bounds the cavity 212a. The slot 212b intercommunicates between the cavity 212a and an exterior of the first side wall 211.

Figure 3:
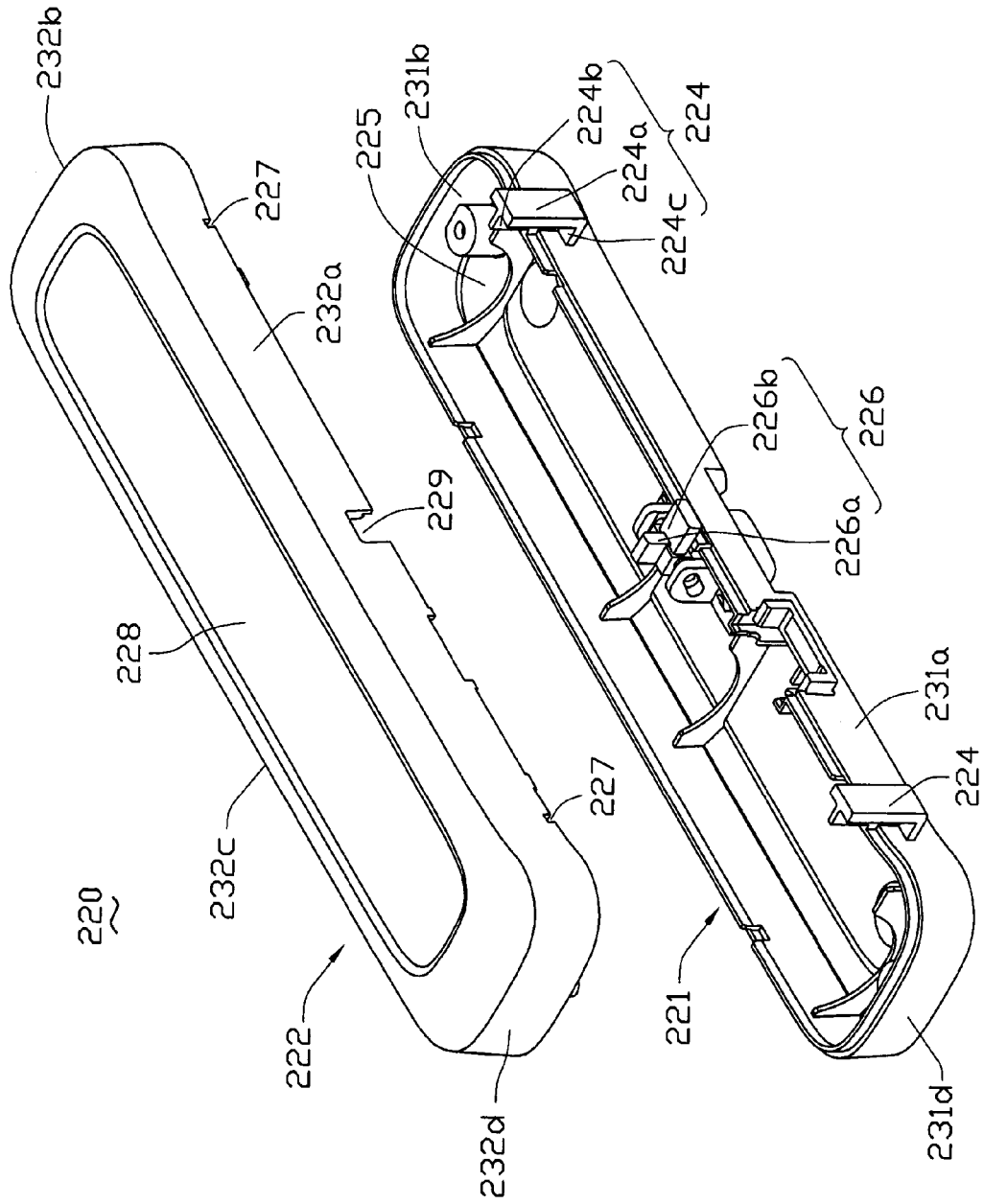
FIG. 3 is an enlarged view of the subsidiary casing of FIG. 1, but viewed from another aspect.

Referring also to FIG. 3, the subsidiary casing 220 includes a base 221 and a cover 222. The base 221 and the cover 222 are hollow cubical containers. The base 221 and the cover 222 cooperatively define a containing space (not shown) for receiving batteries (not shown) therein.

The base 221 includes a bottom 225 and four second side walls 231a, 231b, 231c, 231d respectively extending upwardly from four edges of the bottom 225. The four second side walls 231a, 231b, 231c, 231d interconnect in sequence with each other and surround the bottom 225. Two latches 224 are formed on the second side wall 231a. Each latch 224 includes an outboard part 224a, a middle part 224b, and a connective part 224c. The outboard part 224a is substantially parallel to the second side wall 231a. The middle part 224b extends perpendicularly out from the second side wall 231a to a middle of the outboard part 224a. The connective part 224c connects a bottom of the outboard part 224a and the second side wall 231a. A connector 226 is formed within the base 221 and along an edge of the second side wall 231a. The connector 226 includes a backseat 226a and an inserting block 226b. The backseat 226a is behind the inserting block 226b and connects to it. The inserting block 226b can move toward or away from the main body 210, for inserting into or retreating from the hole 214 of the main body 210.

Similar to the base 221, the cover 222 includes a top 228 and four third side walls 232a, 232b, 232c, 232d respectively extending downwardly from the four edges of the top 228. The four third side walls 232a, 232b, 232c, 232d interconnect in sequence with each other and surround the top 228. Two first notches 227 corresponding to the two latches 224 are defined in two opposite ends of the third side wall 232a, and a second notch 229 corresponding to the connector 226 is defined in a middle of the third side wall 232a.

Figure 4:
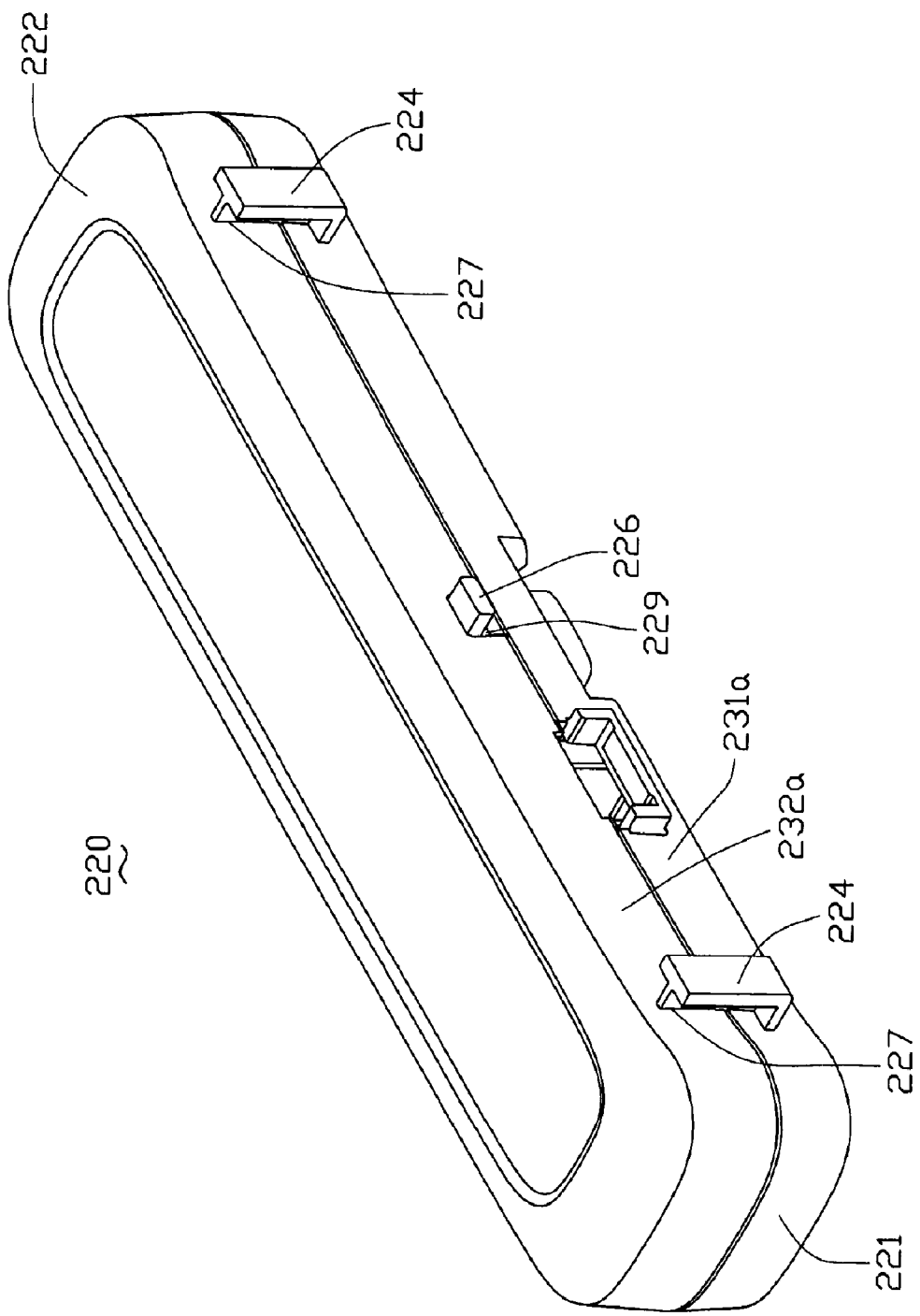
FIG. 4 is an assembled, isometric view of the subsidiary casing of FIG. 1.

Referring to FIG. 4, in assembly of the subsidiary casing 220, first, the base 221 receives batteries (not shown). Then, the middle parts 224c of the latches 224 are received into the first notches 227, and the inserting block 226b of the connector 226 is received into the second notch 229. Thus, the cover 222 is mounted onto the base 221.

Figure 5:
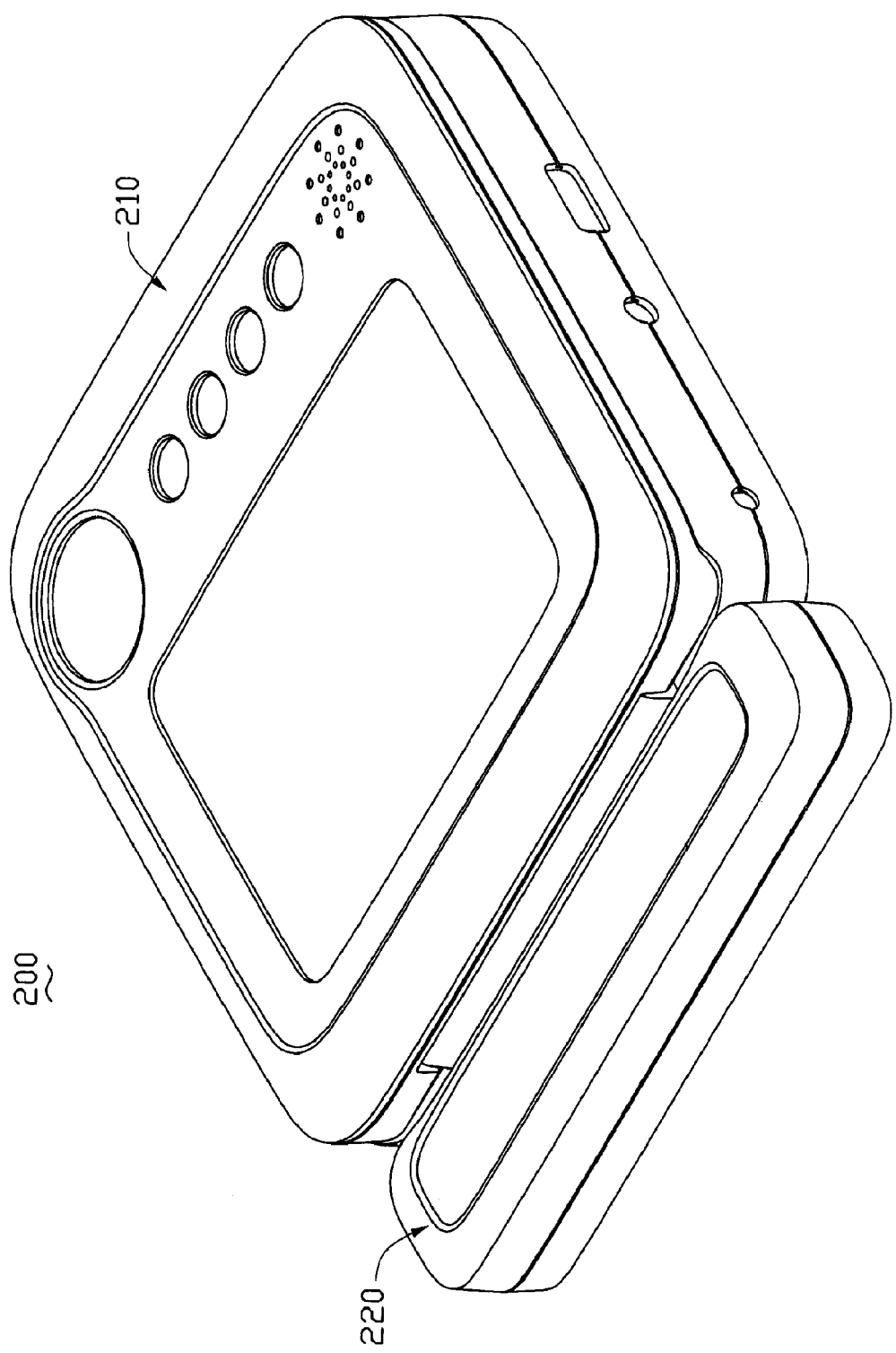
FIG. 5 is an assembled, isometric view of the portable disc player of FIG. 1.
Figure 6:
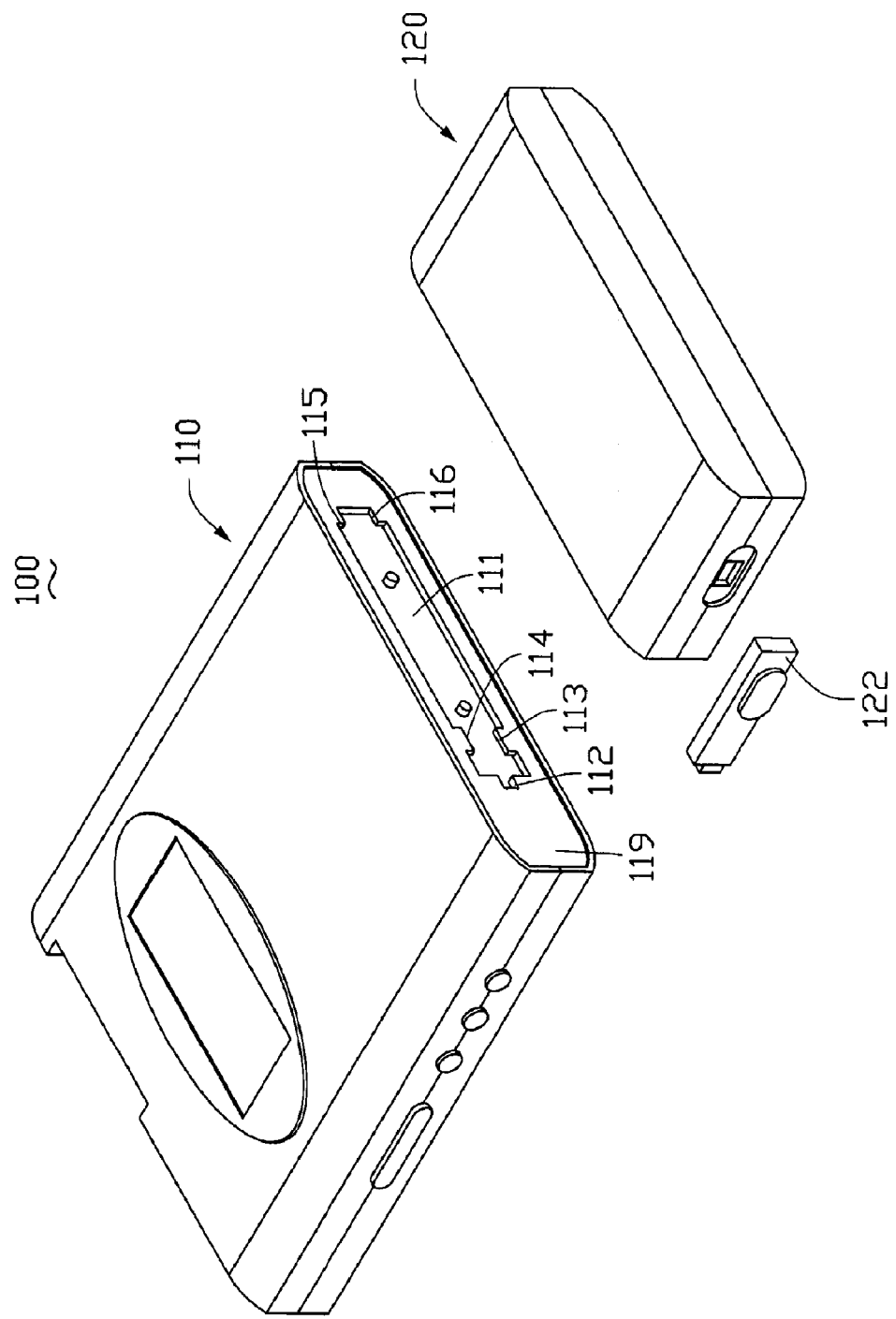
FIG. 6 is an exploded, isometric view of a conventional portable disc player.
Figure 7:
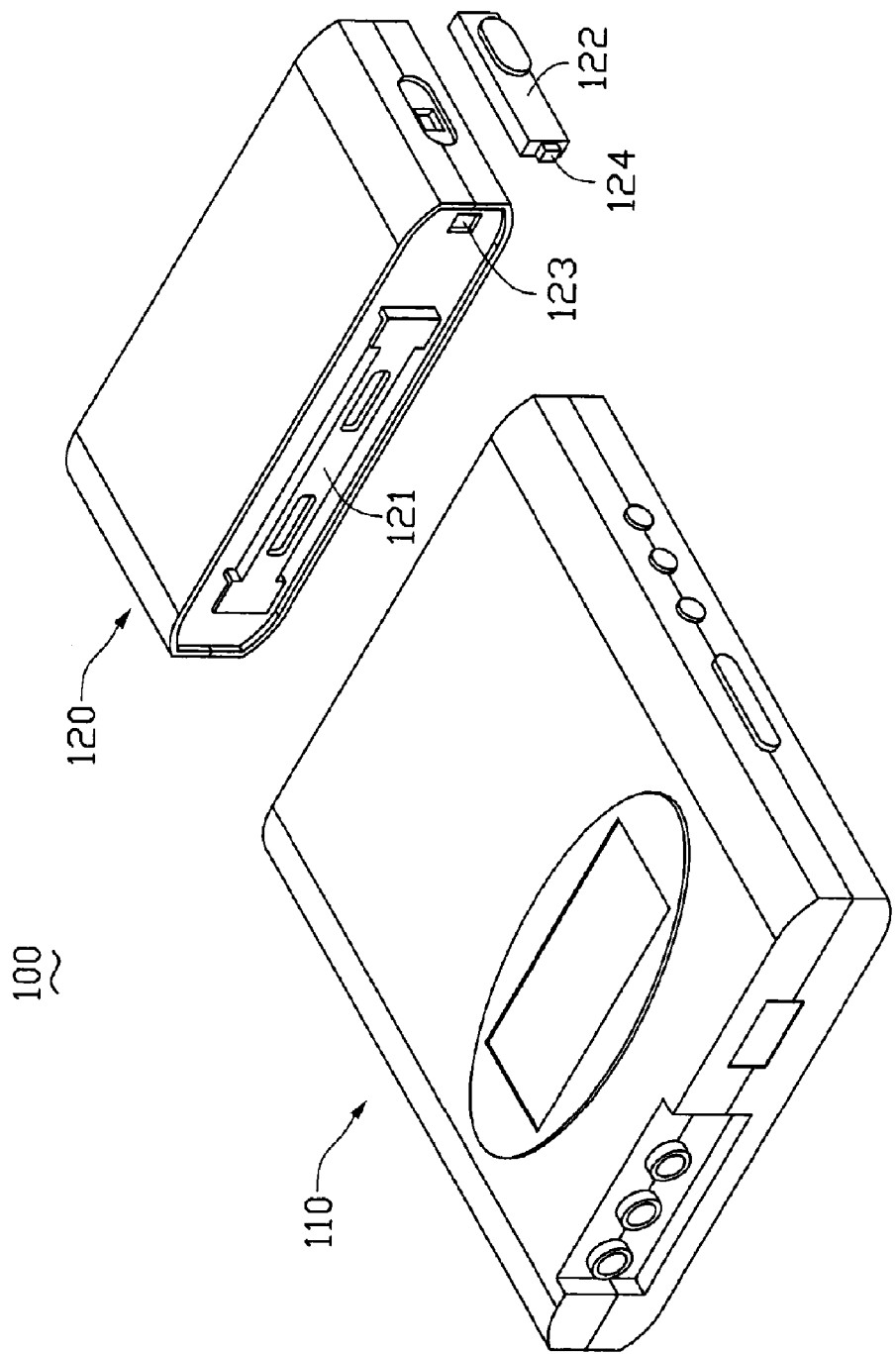
FIG. 7 is similar to FIG. 6, but viewed from another aspect.

When the subsidiary casing 220 is attached to the main body 210, the latches 224 of the subsidiary casing 220 are slid into the corresponding receptacles 212 of the main body 210, and the connector 226 is inserted into the hole 214 as the latches 224 reach the end of the receptacles 212. The latches 224 engaged in the receptacles 212 prevent the subsidiary casing 220 from moving along a first direction perpendicular to the first side wall 211. The connector engaged into the hole 214 prevents the subsidiary casing 220 from moving along a second direction that is perpendicular to the first direction. Thus, as shown in FIG. 5, the subsidiary casing 220 is fixed firmly to the main body 210. When detaching the subsidiary casing 220 from the main body 210, the connector 226 retreats from the hole 214. The latches 224 slide out from the receptacles 212. Then, the subsidiary casing 220 is easily removed from the main body 210. In operation, sliding the latches 224 into the receptacle 212 is a transparent and simple task, so the portable disc player 200 is convenient for users to assemble and disassemble.

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. A portable electronic device comprising:
   a main body comprising a first side wall and a bottom wall, the first side wall defining at least one receptacle and at least one hole therein, the at least one receptacle comprising a cavity and a slot, the cavity spanning from the bottom wall up into the main body, the slot being defined upwardly in a part of the first side wall, the slot intercommunicating between the cavity and an exterior of the first side wall; and
   a subsidiary casing comprising a base and a cover, at least one latch and at least one connector being formed on the base, the at least one latch being configured for being received in the at least one receptacle, the at least one connector being configured for being received in the at least one hole; wherein the base includes a plurality of second side walls, the at least one latch is formed on one of the second side walls, and the cover includes a plurality of third side walls;
   wherein one of the at least one latch extends from the one second side wall to one of the third side walls and a part of the one latch is above the one second side wall.

2. The portable electronic device according to claim 1, wherein the at least one connector is formed within the base and along an edge of the one second side wall.

3. The portable electronic device according to claim 1, wherein the at least one latch comprises an outboard part parallel to the one second side wall, and the outboard part is insertable into the cavity of the main body.

4. The portable electronic device according to claim 3, wherein the at least one latch comprises a middle part extending from the one second side wall to the outboard part, and the middle part is configured for being received in the slot.

5. The portable electronic device according to claim 4, wherein the at least one latch comprises a connective part connecting a bottom end of the outboard part and the one second side wall.

6. The portable electronic device according to claim 5, wherein at least one first notch is defined in the one third side wall, and the at least one first notch is configured for receiving the middle part of the one latch.

7. The portable electronic device according to claim 6, wherein at least one second notch is defined in the one third side wall, and the at least one second notch is configured for receiving the at least one connector.

8. A portable electronic device comprising:
   a main body comprising a first side wall and a bottom wall, the first side wall defining a receptacle and a hole therein, the receptacle comprising a cavity spanning from the bottom wall up into the main body; and a subsidiary casing comprising a base and a cover, the base comprising a plurality of second side walls, a latch and a connector being formed on the base, the latch being received in the receptacle and the connector being received in the hole; wherein the cover comprises a plurality of third side walls, corresponding to the second side walls of the base;

wherein the latch extends from one of the second side walls to one of the third side walls and a part of the one latch is above the one second side wall.

9. The portable electronic device according to claim 8, wherein the latch comprises a first part extending out from the one second side wall, a part of the first side wall upwardly defines a slot therein, the slot intercommunicates between the cavity and an exterior of the first side wall, and the first part is received in the slot.

10. The portable electronic device according to claim 9, wherein the latch comprises a second part extending from the first part towards both two opposite sides of the first part.

11. The portable electronic device according to claim 10, wherein the second part is parallel to the one second side wall.

12. The portable electronic device according to claim 11, wherein the latch comprises a third part connecting a bottom end of the second part to the one second side wall.

* * * * *